(12) United States Patent
Hsieh

(10) Patent No.: US 7,204,466 B2
(45) Date of Patent: Apr. 17, 2007

(54) QUICK-ACTING TELESCOPIC TUBE

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 242 days.

(21) Appl. No.: 11/078,166

(22) Filed: Mar. 11, 2005

(65) Prior Publication Data

US 2006/0202098 A1 Sep. 14, 2006

(51) Int. Cl.
*F16M 11/00* (2006.01)
*F16B 7/10* (2006.01)

(52) U.S. Cl. ............... 248/410; 248/412; 248/157; 403/104

(58) Field of Classification Search ........ 248/410, 248/412, 157, 161, 162.1, 404, 407, 408, 248/709, 159; 403/104, 109.3, 109.5, 110; 84/453
See application file for complete search history.

(56) References Cited

U.S. PATENT DOCUMENTS

| | | | | |
|---|---|---|---|---|
| 2,658,777 A | * | 11/1953 | Rauglas ................ 403/104 |
| 3,604,734 A | * | 9/1971 | Friedman et al. .......... 403/104 |
| 4,033,543 A | * | 7/1977 | Ponzellini .............. 248/412 |
| 4,318,526 A | * | 3/1982 | Werner ................ 248/412 |
| 4,526,334 A | * | 7/1985 | Rantakari ............... 248/157 |
| 4,693,442 A | * | 9/1987 | Sills ................. 248/406.2 |
| 4,744,690 A | * | 5/1988 | Hsieh ................... 403/104 |
| 4,860,987 A | * | 8/1989 | Werner ................. 248/405 |
| 5,078,349 A | * | 1/1992 | Smith ................ 248/125.8 |
| 5,729,865 A | * | 3/1998 | Stoddart ................. 16/429 |
| 6,412,737 B1 | * | 7/2002 | Minagawa ............... 248/166 |
| 6,546,596 B2 | * | 4/2003 | Grote et al. .............. 16/429 |
| 6,609,686 B2 | * | 8/2003 | Malizia ............... 248/125.8 |
| 6,698,698 B1 | * | 3/2004 | Hsieh ................ 248/125.8 |

FOREIGN PATENT DOCUMENTS

GB 2397164 A * 7/2004

* cited by examiner

*Primary Examiner*—Anita M. King
(74) *Attorney, Agent, or Firm*—Merchant & Gould P.C.

(57) ABSTRACT

A quick-acting telescopic tube has a stationary tube, a detent lining, an extension tube, a lock activating assembly, a bottom plug, an activating rod, a spring and a ball. The detent lining is mounted securely in the stationary tube and has multiple detents. The extension tube is mounted movably in the detent lining and has a top and a bottom. The lock activating assembly is mounted around the top of the extension tube and has a lever extending into the extension tube. The bottom plug is mounted securely in the bottom of the extension tube and has a transverse through hole. The activating rod is mounted in the extension tube, connects to the lever and has a locking piston with an annular recess. The ball is mounted in the transverse through hole and selectively in either one of the detents or the annular recess.

6 Claims, 8 Drawing Sheets

QUICK-ACTING TELESCOPIC TUBE

BACKGROUND OF THE INVENTION

1. Field of the Invention

The present invention relates to a telescopic tube, especially to a quick-acting telescopic tube that can support a musical instrument.

2. Description of the Prior Arts

With reference to FIG. 6, a conventional telescopic tube comprises a tube assembly (60), a lock activating assembly (70) and a locking assembly (80).

The tube assembly (60) comprises a stationary tube (61), a plug (62), a locking rod (63), an extension tube (64) and an activating tube (65).

The stationary tube (61) has a bottom. The plug (62) is mounted in the bottom of the stationary tube (61). The locking rod (63) is mounted in the stationary tube (61), is attached to the plug (62) and has multiple locking notches (631). The locking notches (631) are formed separately in the locking rod (63).

With further reference to FIG. 7, the extension tube (64) is mounted slidably in the stationary tube (61) and has a top end, a bottom end, a through hole (641) and an elongated through hole. The through hole (641) is formed transversely through the extension tube (64) near the top end. The elongated through hole is formed longitudinally near the bottom end.

The activating tube (65) is mounted slidably in the extension tube (64) around the locking rod (63) and has a top, a fastening hole (651), a mounting slot, a drive-pin hole and a drive pin (652). The fastening hole (651) is formed transversely through the activating tube (65) near the top. The mounting slot is formed longitudinally through the activating rod (65), communicates with the top and has a bottom end. The drive-pin hole is formed transversely through the activating tube (65) near the bottom end of the mounting slot. The drive pin (652) is mounted in the drive-pin hole.

The lock activating assembly (70) comprises a sleeve (71), a fastening pin (72), a spring (73) and a lever (74). The sleeve (71) is mounted securely around the extension tube (64) and has a through hole and a bracket (711). The through hole is formed through the sleeve (71) and aligns with the through hole (641) in the extension tube (64). The bracket (711) is formed on the sleeve (71). The fastening pin (72) extends through the aligned through holes (641) in the extension tube (64) and the sleeve (71). The spring (73) is attached to the fastening pin (72) and to the top of the activating tube (65). The lever (74) is L-shaped, is mounted pivotally in the bracket (711) and has a longitudinal arm (741) and a transverse arm (742). The longitudinal arm (741) pivots in the bracket (711). The transverse arm (742) connects to the longitudinal arm (741), extends into the mounting slot in the activating tube (65) and has an elongated drive-pin hole (743) formed through the transverse arm (742). The drive pin (652) is mounted through the drive-pin hole in the activating tube (65) and the elongated drive-pin hole (743) in the transverse arm (742).

With further reference to FIG. 8, the locking assembly (80) comprises a locking sleeve (81) and a clamp (82).

The locking sleeve (81) is mounted around the extension tube (64), connected to the activating tube (65) and has a pin (811), a bottom hole and a conical interior surface (812). The pin (811) is mounted through the locking sleeve (81), the elongated hole in the extension tube (64) and the activating tube (65) to slide the locking sleeve (81) on the extension tube (64) when the lever (74) on the lock activating assembly (70) is pressed or released. The conical interior surface (812) is formed adjacent to the bottom hole.

The clamp (82) connects pivotally to the extension tube (64), engages the conical interior surface (812) when the lever (74) on the lock activating assembly (70) is released and has two wings (821), a spring (822) and two latch pins (823). The wings (821) are semicylindrical and are attached pivotally to the bottom end of the extension tube (64). Each wing (821) has a proximal end, a distal end and a tapered head. The proximal end is attached pivotally to the bottom end of the extension tube (64). The tapered head is formed at the distal end and has a transverse latch pin hole. The tapered heads are pressed toward each other when the lever (74) on the lock activating assembly (70) is released. The spring (822) is mounted between the tapered heads of the two wings (821) and presses the tapered heads apart when the lever (74) on the lock activating assembly (70) is pressed and pushes the locking sleeve (81) down. The latch pins (823) are mounted respectively in the latch pin holes in the heads of the wings (821) and selectively engage locking notches (631) on the locking rod (63) when the conical interior surface (812) on the locking sleeve (81) presses the wings (821) together.

When the latch pins (823) engage the locking notches (631), the extension tube (64) is locked in place relative to the stationary tube (61).

However, the conventional telescopic tube is more expensive because the conventional telescopic tube comprises many components, and the components are complicated.

To overcome the shortcomings, the present invention provides a quick-acting telescopic tube with simple and fewer components to mitigate or obviate the aforementioned problems.

SUMMARY OF THE INVENTION

The main objective of the present invention is to provide a quick-acting telescopic tube that has fewer and simple components and can support a musical instrument. The quick-acting telescopic tube has a stationary tube, a detent lining, an extension tube, a lock activating assembly, a bottom plug, an activating rod, a spring and a ball. The detent lining is mounted securely in the stationary tube and has multiple detents. The extension tube is mounted movably in the detent lining and has a top and a bottom. The lock activating assembly is mounted around the top of the extension tube and has a lever extending into the extension tube. The bottom plug is mounted securely in the bottom of the extension tube and has a transverse through hole. The activating rod is mounted in the extension tube, connects to the lever and has a locking piston with an annular recess. The spring is mounted between the bottom plug and the locking piston. The ball is mounted in the transverse through hole and selectively in either a detent in the detent lining or the annular recess in the locking piston.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
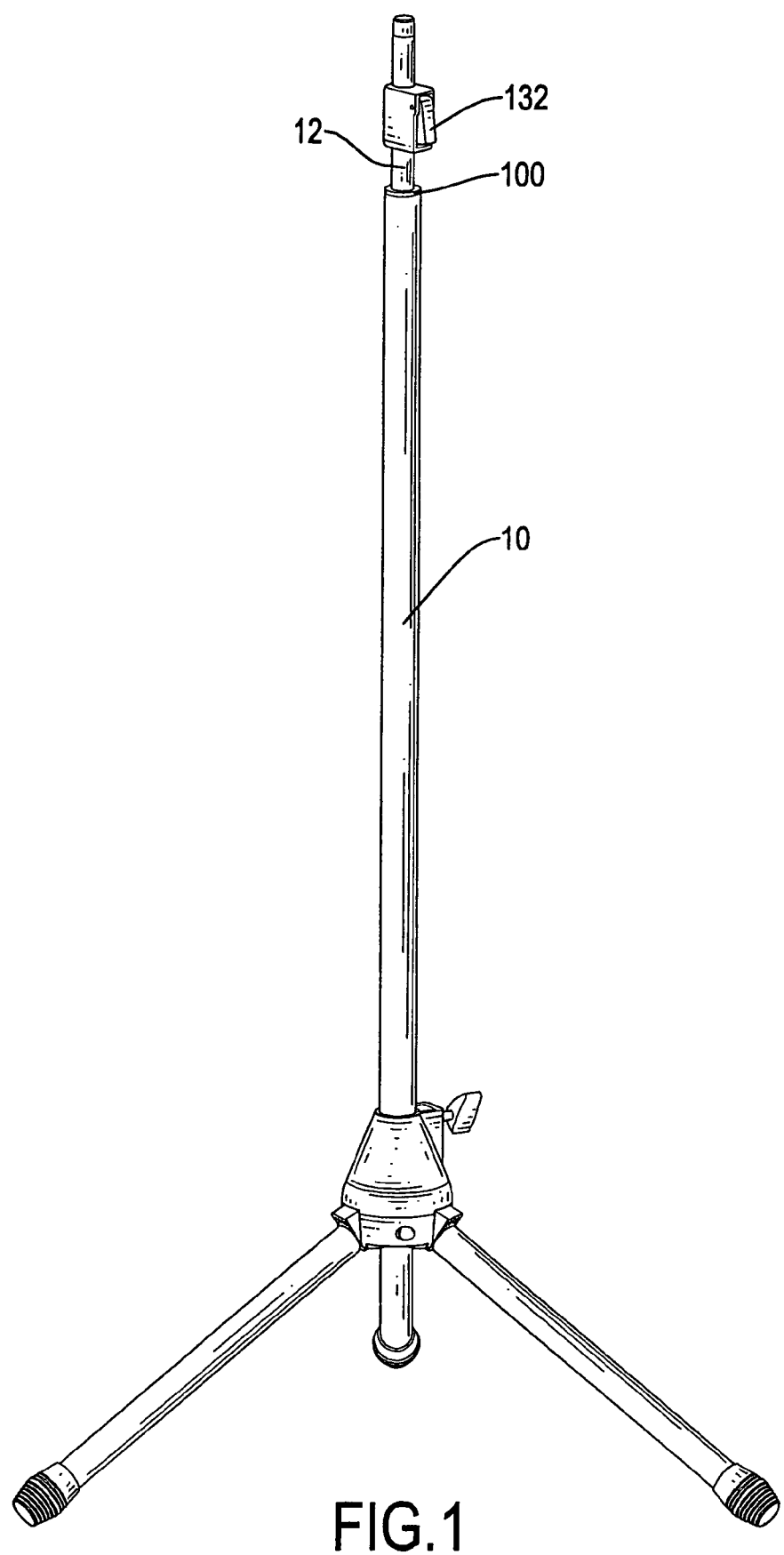
FIG. 1 is a perspective view of a quick-acting telescopic tube in accordance with the present invention with a microphone support.
Figure 2:
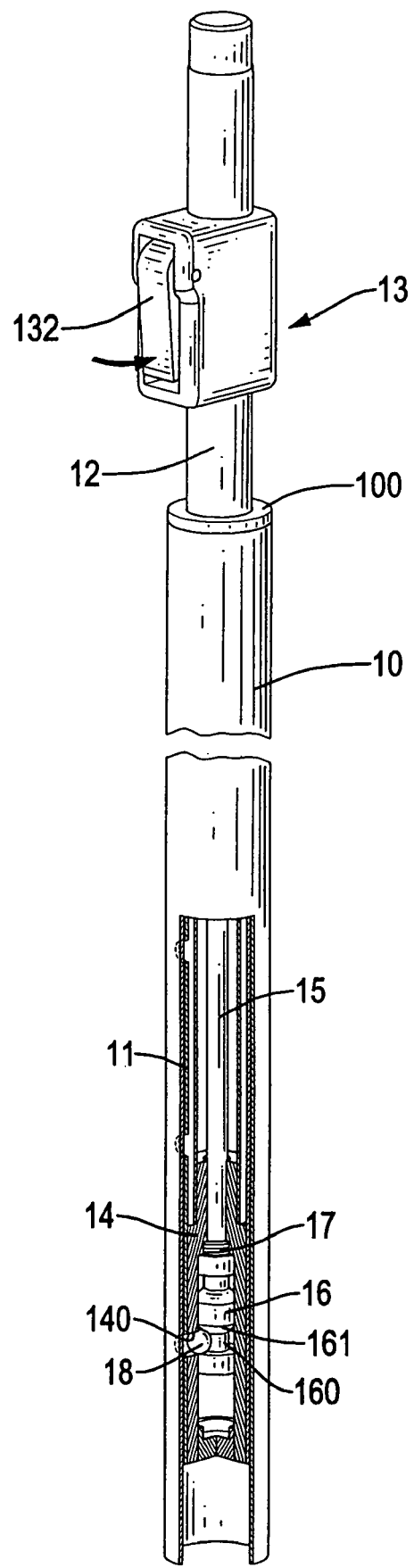
FIG. 2 is a perspective view in partial section of the quick-acting telescopic tube in FIG. 1 when the extension tube is unlocked.

With reference to FIGS. 1 and 2, a quick-acting telescopic tube in accordance with the present invention comprises a stationary tube (10), a detent lining (11), an extension tube (12), an lock activating assembly (13), a bottom plug (14), an activating rod (15), a spring (17) and a ball (18).

Figure 3:
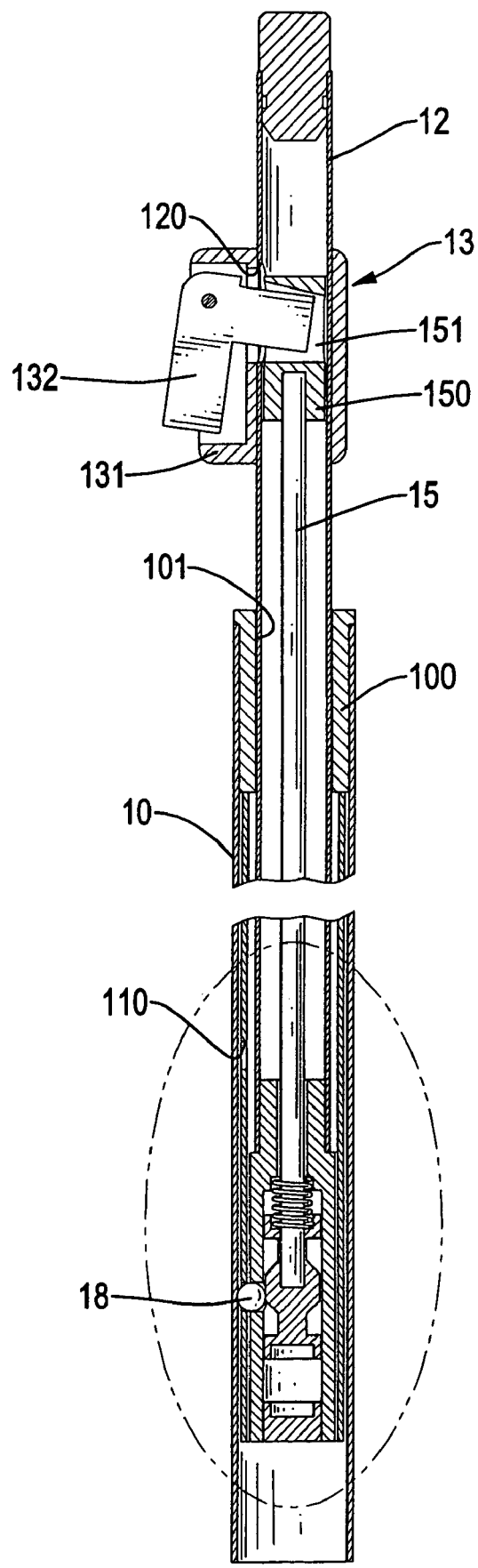
FIG. 3 is a side view in partial section of the quick-acting telescopic tube in FIG. 1 when the extension tube is locked.

With further reference to FIG. 3, the stationary tube (10) has a top, a bottom and a bushing (100). The bushing (100) is mounted in the top of the stationary tube (10) and has a through hole (101). The through hole (101) is formed coaxially through the bushing (100).

The detent lining (11) is mounted securely in the stationary tube (10) and has a top, a sidewall and multiple detents (110). The detents (110) are formed separately in the sidewall of the detent lining (11) and may be annular grooves, annular slots, through holes or the like.

The extension tube (12) is mounted movably in the detent lining (11) and the stationary tube (10), extends through the through hole (101) in the bushing (100) and has a top, a bottom, a sidewall and an activating hole (120). The activating hole (120) is formed through the sidewall near the top of the extension tube (12).

The lock activating assembly (13) is mounted around the extension tube (12) and has a bracket (131) and a lever (132). The bracket (131) is mounted around the extension tube (12) near the top of the extension tube (12) and has a through hole corresponding to the activating hole (120) in the extension tube (12). The lever (132) is mounted pivotally in the bracket (131) and has a distal end that extends through the activating hole (120) into the extension tube (12).

Figure 4:
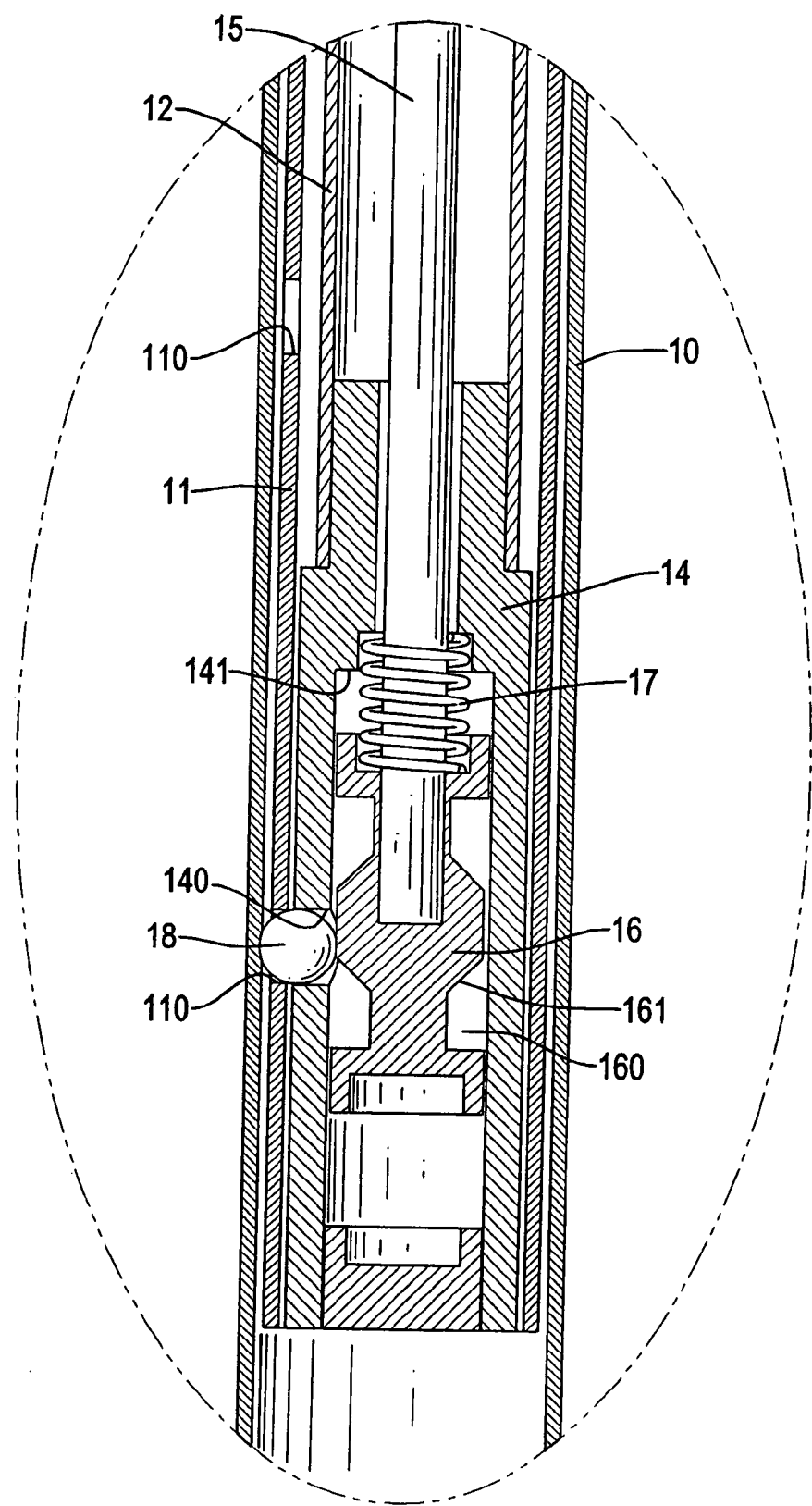
FIG. 4 is an enlarged side view in partial section of the quick-acting telescopic tube in FIG. 1 when the extension tube is locked.

With further reference to FIG. 4, the bottom plug (14) is hollow, is mounted securely in the bottom of the extension tube (12) and slidably in the detent lining (11) and has a top opening, an inner shoulder (141), a sidewall and a transverse through hole (140). The inner shoulder (141) is formed in the bottom plug (14) near the top opening. The transverse through hole (140) is formed in the sidewall of the bottom plug (14) and corresponds to the detents (110) in the detent lining (11).

The activating rod (15) is mounted movably in the extension tube (12), connects to the lever (132) and has a top, a bottom, a pivoting connector and a locking piston (16).

The pivoting connector connects the top of the activating rod (15) to the lever (132) and may be a pivot block (150).

The pivot block (150) is attached to the top of the activating rod (15), is mounted movably in the extension tube (12), pivotally holds the distal end of the lever (132) and has a socket (151). The socket (151) is formed in the pivot block (150), corresponds to the activating hole (120) in the extension tube (12) and holds the distal end of the lever (132). Pressing the lever (132) lifts the pivoting connector and the activating rod (15).

The locking piston (16) is attached to the bottom of the activating rod (15) and has an annular recess (160) and an optional inclined surface (161). The annular recess (160) is formed in the locking piston (16). The inclined surface (161) is formed in the locking piston (16) and connects to the annular recess (160).

The spring (17) is mounted around the activating rod (15) between the inner shoulder (141) in the bottom plug (14) and the locking piston (16).

The ball (18) is mounted movably in the transverse through hole (140) in the bottom plug (14) and selectively in either one of the detents (110) in the detent lining (11) or the annular recess (160) in the locking piston (16).

With reference to FIGS. 3 and 4, the extension tube (12) is locked relative to the stationary tube (10) when the locking piston (16) holds the ball (18) in one of the detents (110) in the detent lining (11).

Figure 5:
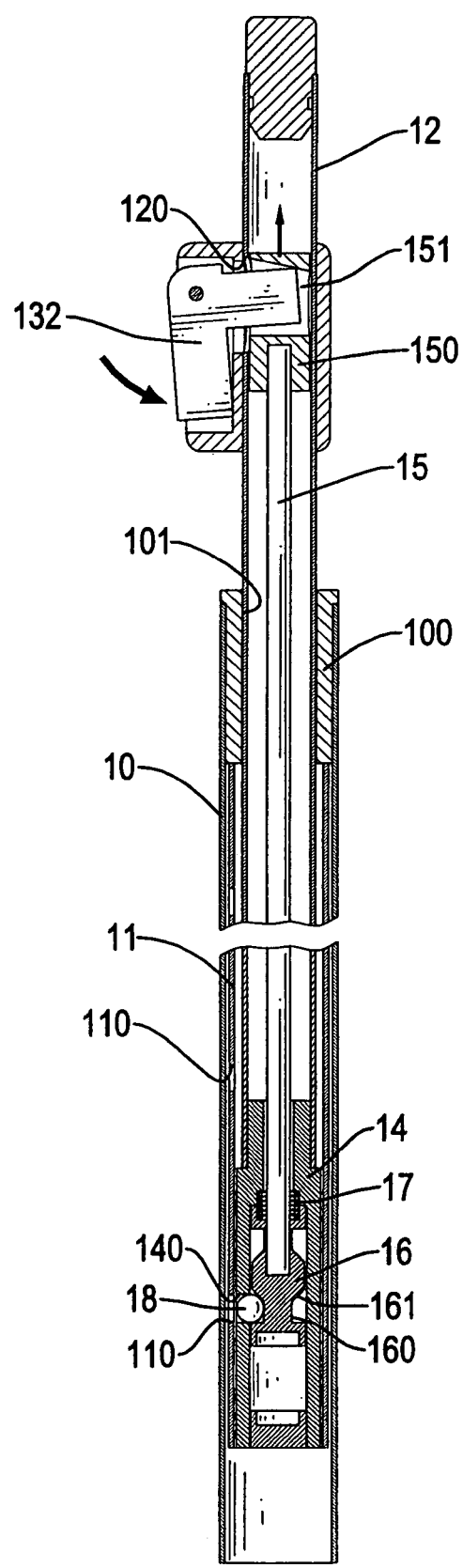
FIG. 5 is a side view in partial section of the quick-acting telescopic tube in FIG. 1 when the extension tube is unlocked.
Figure 6:
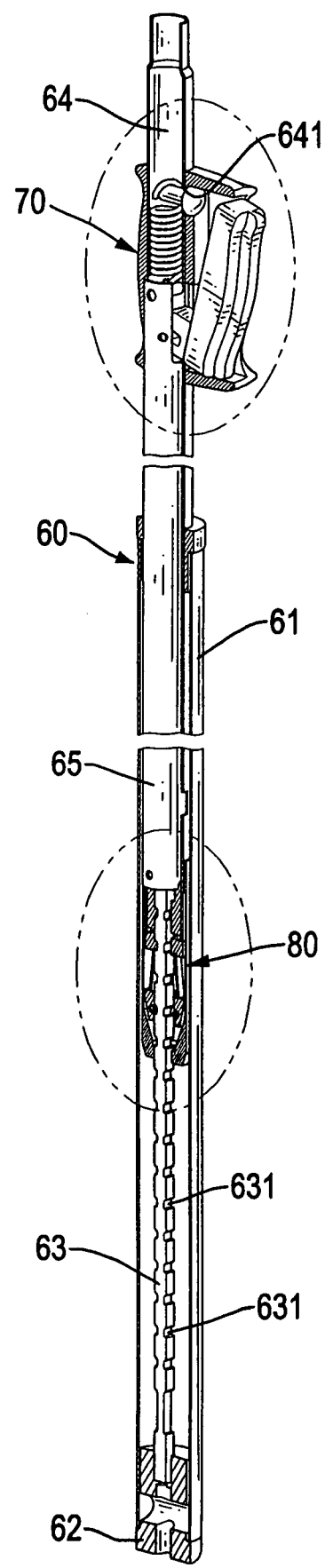
FIG. 6 is a perspective view in partial section of a conventional telescopic tube in accordance with the prior art.
Figure 7:
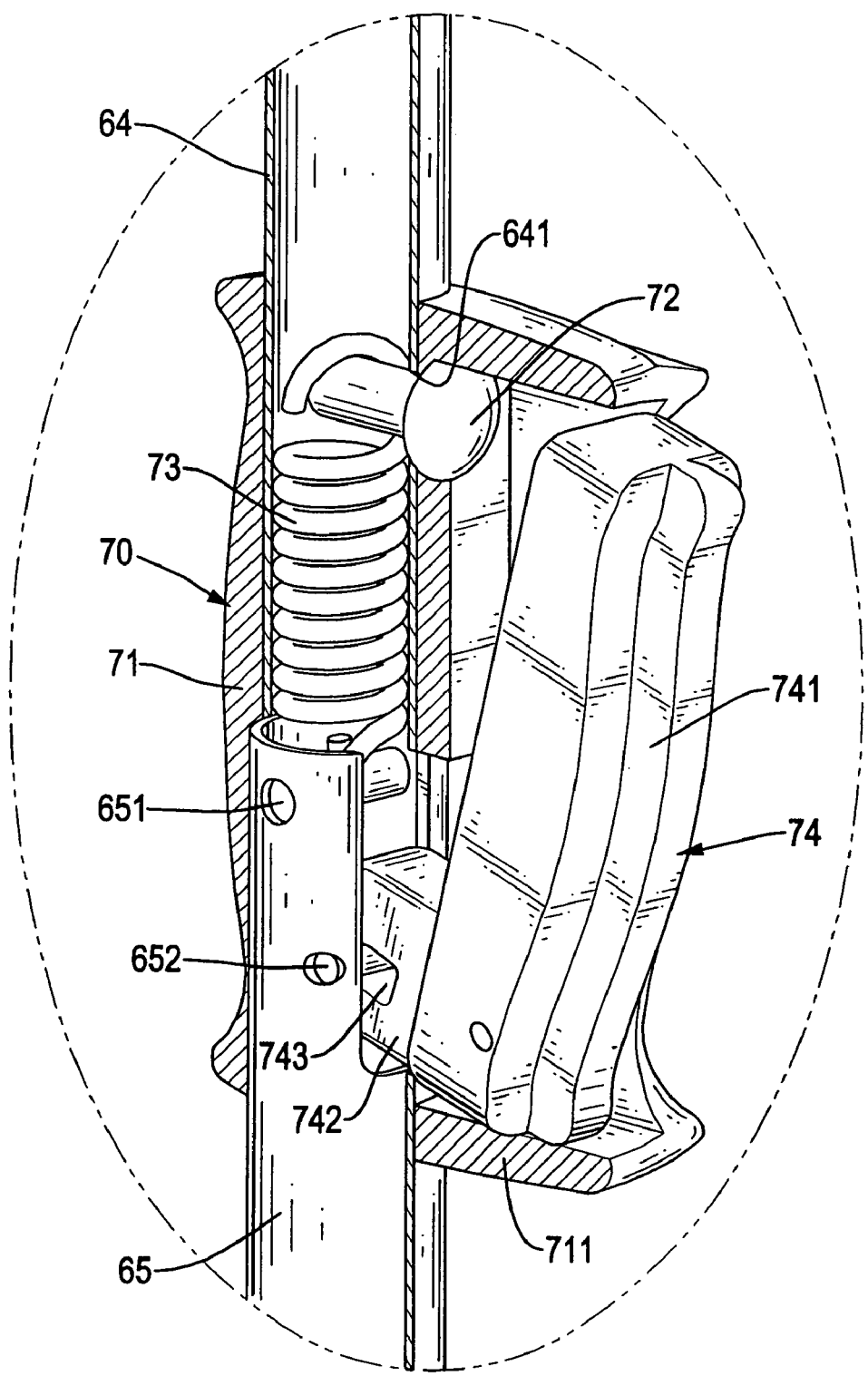
FIG. 7 is an enlarged perspective view in partial section of a lock activating assembly in the conventional telescopic tube in FIG. 6.
Figure 8:
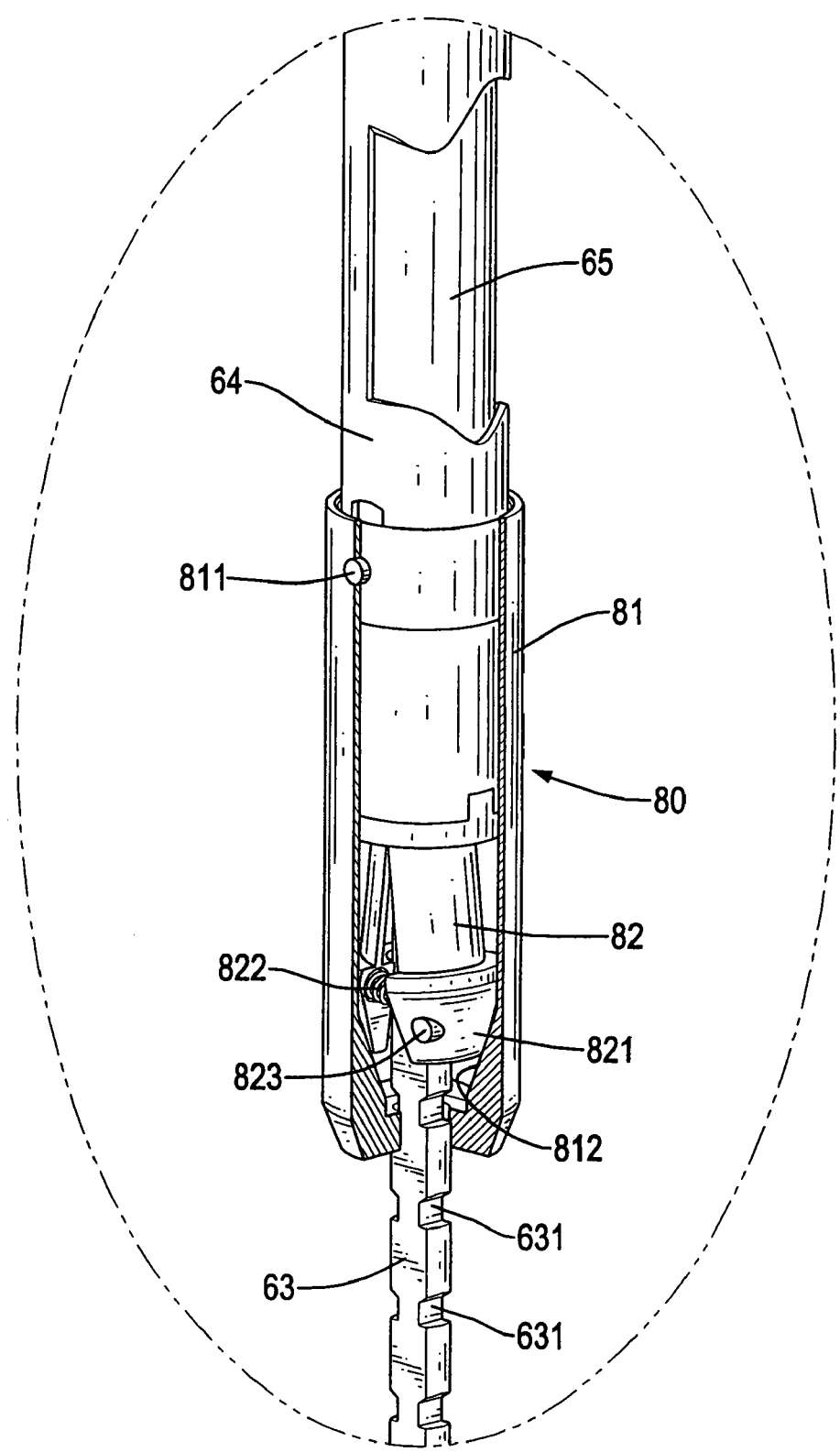
FIG. 8 is an enlarged perspective view in partial section of a locking assembly in the conventional telescopic tube in FIG. 6.

With further reference to FIG. 5, the extension tube (12) is released from the stationary tube (10) by pressing the lever (132) in the lock activating assembly (13), which lifts the activating rod (15) and the locking piston (16) and aligns the annular recess (160) with the ball (18) in a detent (110) and the transverse through hole (140) in the bottom plug (14). Pushing or pulling the extension rod (12) causes the ball (18) to detach from the detent (110) in the detent lining (11) and slide into the annular recess (160) in the locking piston (16). Then the extension tube (12) can be moved upward or downward.

When the lever (132) is released, the spring (17) pushes the locking piston (16) downward. When a detent (110) aligns with the transverse through hole (140), the locking piston (16) pushes the ball (18) into and holds the ball (18) in the aligned detent (110) in the detent lining (11). Then the extension tube (12) is locked in place relative to the stationary tube (10).

The advantage of the present invention is that the quick-acting telescopic tube as described has fewer components, is simple and cost less.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quick-acting telescopic tube comprising
  a stationary tube having
    a top;
    a bottom; and
    a bushing mounted in the top of the stationary tube and having a through hole formed coaxially through the bushing;
  a detent lining mounted securely in the stationary tube and having
    a top;
    a sidewall; and multiple detents formed separately in the sidewall of the detent lining;

an extension tube mounted movably in the detent lining and the stationary tube, extending through the through hole in the bushing and having
- a top;
- a bottom;
- a sidewall; and
- an activating hole formed through the sidewall near the top of the extension tube;

a lock activating assembly mounted around the extension tube and having
- a bracket mounted around the extension tube near the top of the extension tube and having a through hole corresponding to the activating hole in the extension tube; and
- a lever mounted pivotally in the bracket, extending through the activating hole into the extension tube and having a distal end;

a bottom plug being hollow, mounted securely in the bottom of the extension tube and slidably in the detent lining and having
- a top opening;
- an inner shoulder formed in the bottom plug near the top opening;
- a sidewall; and
- a transverse through hole formed in the sidewall of the bottom plug and corresponding to the detents in the detent lining;

an activating rod mounted movably in the extension tube, connecting to the lever and having
- a top connecting to the lever;
- a bottom;
- a pivoting connector connecting the top of the activating rod to the lever; and
- a locking piston attached to the bottom of the activating rod and having an annular recess formed in the locking piston;

a spring mounted around the activating rod between the inner shoulder in the bottom plug and the locking piston; and a ball mounted movably in the transverse through hole in the bottom plug and selectively in either one of the detents in the detent lining or the annular recess in the locking piston.

2. The quick-acting telescopic tube as claimed in claim 1, wherein the pivoting connector on the activating rod is a pivot block attached to the top of the activating rod, is mounted movably in the extension tube, pivotally holds the distal end of the lever and has
- a socket formed in the pivot block, corresponding to the activating hole in the extension tube and holding the distal end of the lever.

3. The quick-acting telescopic tube as claimed in claim 1, wherein the locking piston further comprises an inclined surface formed on the locking piston and connecting to the annular recess.

4. The quick-acting telescopic tube as claimed in claim 2, wherein the locking piston further comprises an inclined surface formed on the locking piston and connecting to the annular recess.

5. The quick-acting telescopic tube as claimed in claim 1, wherein the detents in the detent lining are through holes.

6. The quick-acting telescopic tube as claimed in claim 4, wherein the detents in the detent lining are through holes.

* * * * *